US008808091B2

(12) United States Patent
Shaw et al.

(10) Patent No.: US 8,808,091 B2
(45) Date of Patent: Aug. 19, 2014

(54) CUSTOM MESSAGE ACTIONS

(75) Inventors: David R. Shaw, North Bend, WA (US); Henry Paul Morgan, Redmond, WA (US); Jerry A. Johnson, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 1247 days.

(21) Appl. No.: 11/686,684

(22) Filed: Mar. 15, 2007

(65) Prior Publication Data

US 2008/0227540 A1 Sep. 18, 2008

(51) Int. Cl.
*A63F 13/12* (2006.01)
*A63F 13/10* (2006.01)

(52) U.S. Cl.
CPC ........... *A63F 13/12* (2013.01); *A63F 2300/572* (2013.01); *A63F 2300/537* (2013.01); *A63F 13/10* (2013.01)
USPC .............................................. 463/42; 463/40

(58) Field of Classification Search
USPC ................................ 463/40, 42; 709/204, 206
See application file for complete search history.

(56) References Cited

U.S. PATENT DOCUMENTS

| | | | | |
|---|---|---|---|---|
| 6,800,031 | B2 | 10/2004 | Di Cesare | 463/40 |
| 6,951,516 | B1 * | 10/2005 | Eguchi et al. | 463/40 |
| 2002/0025853 | A1 * | 2/2002 | Kojima et al. | 463/42 |
| 2002/0086732 | A1 * | 7/2002 | Kirmse et al. | 463/42 |
| 2002/0165026 | A1 * | 11/2002 | Perkins et al. | 463/42 |
| 2003/0224856 | A1 | 12/2003 | Bukovsky et al. | 463/42 |
| 2004/0162144 | A1 | 8/2004 | Loose et al. | 463/42 |
| 2005/0037845 | A1 | 2/2005 | Rozkin et al. | 463/42 |
| 2005/0181878 | A1 | 8/2005 | Danieli et al. | 463/42 |
| 2005/0261062 | A1 * | 11/2005 | Lewin et al. | 463/42 |
| 2005/0273496 | A1 * | 12/2005 | Jean et al. | 709/206 |
| 2006/0025220 | A1 | 2/2006 | Macauley et al. | 463/42 |
| 2006/0036692 | A1 * | 2/2006 | Morinigo et al. | 709/206 |
| 2006/0121986 | A1 * | 6/2006 | Pelkey et al. | 463/40 |
| 2006/0211493 | A1 | 9/2006 | Walker et al. | 463/29 |
| 2006/0223600 | A1 * | 10/2006 | Wisdom et al. | 463/1 |
| 2006/0287106 | A1 | 12/2006 | Jensen | 463/42 |
| 2007/0173323 | A1 * | 7/2007 | Johnson et al. | 463/42 |
| 2007/0173324 | A1 * | 7/2007 | Multerer et al. | 463/42 |
| 2007/0207860 | A1 * | 9/2007 | Yamauchi et al. | 463/42 |
| 2008/0139301 | A1 * | 6/2008 | Holthe | 463/25 |
| 2009/0118020 | A1 * | 5/2009 | Koivisto et al. | 463/42 |

FOREIGN PATENT DOCUMENTS

WO WO 2005029270 A2 * 3/2005
WO WO 2006025255 A1 * 3/2006

OTHER PUBLICATIONS

Ducheneault, N. et al., "The Social Side of Gaming: A Study of Interaction Patterns in a Massively Multiplayer Online Game", *CSCW*, 2004, http://delivery.acm.org, 360-369.

Fujimoto, T., "Social Interactions Experienced in the Massively Online Game Environment: Implications in the Design of Online Learning Courses", *Annual Conference of the Association for Educational Communications and Technology*, Oct. 20, 2005, http://www.personal.psu.edu, 9 pages.

* cited by examiner

*Primary Examiner* — Jay Trent Liddle

(74) *Attorney, Agent, or Firm* — Bryan Webster; Andrew Sanders; Micky Minhas

(57) ABSTRACT

Methods and computer-readable media are provided that enable a game console to send, receive and process a customized message. In one such method, an instruction to generate a message to be sent to a receiving game console is received. The message, which includes a recipient identifier, text relating to a game-specific function, a custom action associated with the game-specific function and a data payload that is adapted to be processed by a receiving destination is generated. The message is sent to a receiving game console identified by the recipient identifier by way of a game console messaging service.

20 Claims, 5 Drawing Sheets

CUSTOM MESSAGE ACTIONS

BACKGROUND

Game consoles and systems have progressively become more complex and capable of providing enhanced game play functionality to a user. For example, early conventional game consoles were designed to be used as a stand-alone device, whereby one or more users could interact with a game only if they were physically present at the game console. More advanced conventional game consoles may be used in connection with a network, such as the Internet, to enable game play between multiple users, regardless of where the users may be located. A gaming system may enable the multiple users to interact with each others' game consoles, thereby enabling the multiplayer games to be conducted. To help facilitate such multiplayer games, game consoles may enable users to send messages to other users within a closed loop gaming system.

One problem with such gaming systems is that system messaging systems typically do not provide mechanisms for game data to be transferred from user to user through the system. Users are limited to sending simple text, voice or picture messages with no ability to handle custom game actions or content. In other words, the operation of the messaging system—and the messages transmitted therein—is specified by the system and not the game being played. Such a system is referred to as a "closed loop" system because the system isolates the functions of the messaging system from the applications (i.e., games) that may be running on the system.

As an example, if a user of a conventional gaming system wishes to invite another user to a "guild," or group of like-minded users of a particular game, the inviting user could send a invitation message to the invitee using a conventional closed loop messaging system. The message may contain instructions for the invitee to follow to be able to join the guild. Typically, the invitee would have to leave the game console (or at least the game environment) to visit a web site associated with the gaming system, and then would have to follow further instructions to join the guild. It can be seen that this is a cumbersome process, as it would be more efficient for the invitee to simply respond to the invitation message, and then the invitee's game console could carry out the steps needed to appropriately respond to the message. Furthermore, it would be even more efficient if the message would inform the invitee's game console of the preferred way to respond to the message.

Unfortunately, a conventional closed loop messaging system provides for simple, predefined (and typically text-based) messages to be sent between game consoles, and does not provide for additional functionality that may be provided by a game. Thus, there is a disconnect between the system-level, closed loop messaging system, and the application-level games that may have game-specific actions that, if they could be sent using the closed loop messaging system, would provide additional features and benefits to the users of the game, game console and gaming system.

SUMMARY

In view of the foregoing drawbacks and shortcomings, methods and computer-readable media are provided that enable a game console to send, receive and process a customized message. In one such method, an instruction to generate a message to be sent to a receiving game console is received. The message, which includes a recipient identifier, text relating to a game-specific function, a custom action associated with the game-specific function and a data payload that is adapted to be processed by a receiving destination is generated. The message is sent to a receiving game console identified by the recipient identifier by way of a game console messaging service.

In another such method, a message is received at a game console, where the message includes a recipient identifier, text relating to a game-specific function, a custom action associated with the game-specific function and a data payload that is adapted to be processed by a receiving destination. A user interface that displays the text and provides the custom action is presented to a user. A user action with respect to the custom action is received, and an indication of the user action and the message is sent to the receiving destination.

In one such computer-readable medium, a data structure is stored thereon. The data structure includes a first data field containing data representing a recipient identifier, a second data field containing data representing text relating to a game-specific function, a third data field containing data representing a custom action associated with the game-specific function and a fourth data field containing data representing a data payload that is adapted to be processed by a receiving destination identified by the recipient identifier.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following detailed description of the various embodiments, is better understood when read in conjunction with the appended drawings. For the purpose of illustrating such embodiments, there is shown in the drawings example constructions of various embodiments; however, such embodiments are not limited to the specific methods and instrumentalities disclosed. In the drawings.

DETAILED DESCRIPTION

The subject matter of the described embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Overview

An embodiment provides an Application Program Interface (API) or the like that may be exposed to an application running on a game console, such as a game application. The API enables the game application to send a customized message to a user of another game console using the game console's closed loop messaging service such as, but not limited to, Xbox Live. The customized message may pertain to any type of game-specific activity and may contain text, one or more options, and data. The data may be in the form of a "blob," which colloquially refers to data that will simply be passed through a game console that receives the message. In addition, the message may include execution data that contains an indication of the manner in which a receiving game console should carry out an option when the option is selected by a user. For example, the execution data may include a Universal Resource Locator (URL) of a Live Server Proxy (LSP) or the like. Alternatively, the execution data may identify a game application to which the receiving game console should forward the message. Once generated by the game application, the message may be sent by way of the game console's closed loop messaging system.

In addition, an embodiment provides an API for enabling a game console to receive the message from the sending game console. The API then enables the receiving game console to generate a user interface that presents the text and one or more options of the message to a user. Upon receiving a user input relative to an option, the game console takes an action as specified by the execution data associated with the option. For example, the indication may be for the game console to pass the message, including any "blob" of data that may be part of the message, as well as the user selection, to a game application. Alternatively, the indication may be for the game console to pass the message to an LSP. The "blob" of data may contain information necessary for the game console or LSP to carry out the specified action.

Example Game Console

Figure 1:
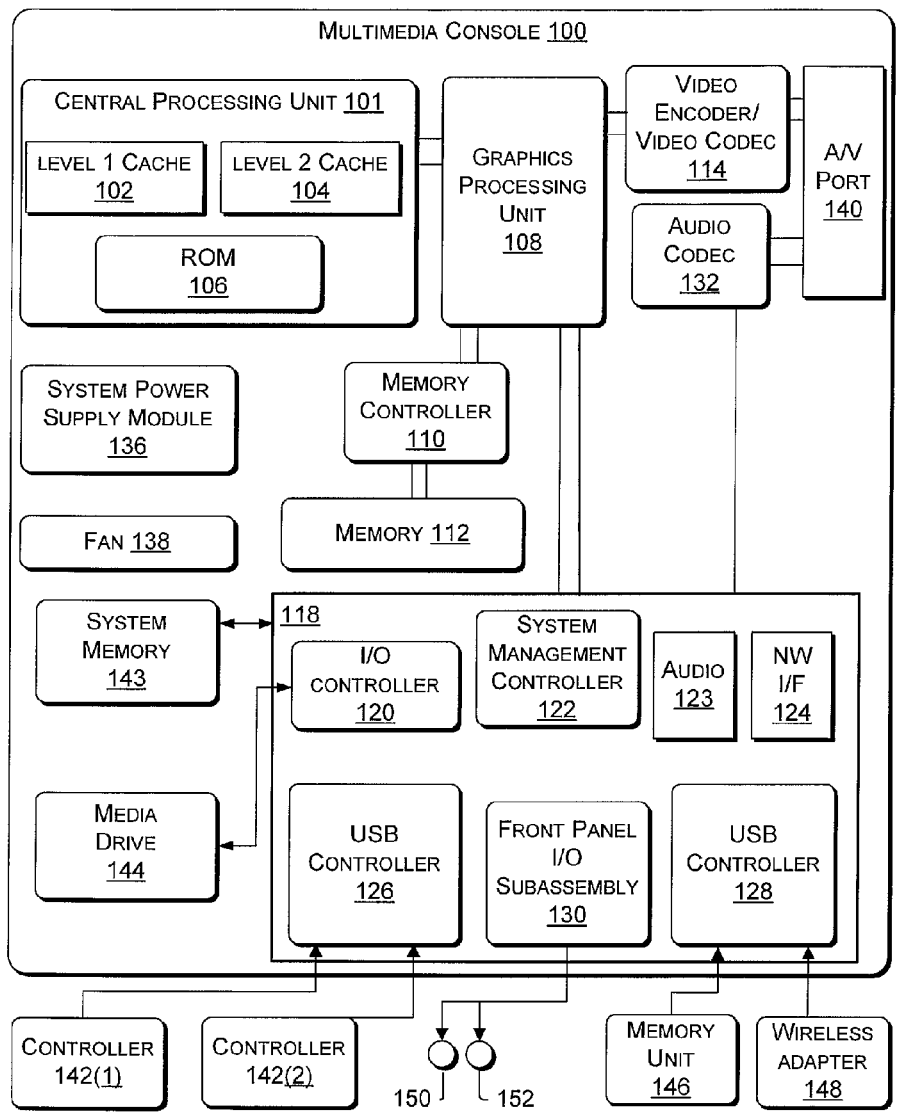
FIG. 1 is a diagram illustrating an example console that can be incorporated into a network computing environment such as the network computing environment of FIG. 1.

FIG. 1 illustrates functional components of a multimedia/game console 100 that may be used in connection with an embodiment. An example of a known game console 100 is Microsoft Corporation's XBox® game system. Multimedia console 100 has central processing unit (CPU) 101 having level 1 cache 102, level 2 cache 104 and flash ROM (Read Only Memory) 106. Level 1 cache 102 and level 2 cache 104 temporarily store data and hence reduce the number of memory access cycles, thereby improving processing speed and throughput. CPU 101 may be provided having more than one core, and thus, additional level 1 and level 2 caches 102 and 104. Flash ROM 106 may store executable code that is loaded during an initial phase of a boot process when multimedia console 100 is powered ON, for example.

Graphics processing unit (GPU) 108 and video encoder/video codec (coder/decoder) 114 form a video processing pipeline for high speed and high resolution graphics processing. Data is carried from graphics processing unit 108 to video encoder/video codec 114 via a bus. The video processing pipeline outputs data to A/V (audio/video) port 140 for transmission to a television or other display. Memory controller 110 is connected to GPU 108 to facilitate processor access to various types of memory 112, such as, but not limited to, a RAM (Random Access Memory).

Multimedia console 100 may also include I/O controller 120, system management controller 122, audio processing unit 123, network interface controller 124, first USB host controller 126, second USB controller 128 and front panel I/O subassembly 130 that are preferably implemented on module 118. USB controllers 126 and 128 serve as hosts for peripheral controllers 142(1)-142(2), wireless adapter 148, and external memory device 146 (e.g., flash memory, external CD/DVD ROM drive, removable media, etc.). Network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem and the like.

System memory 143 may be provided to store application data that is loaded during the boot process. Media drive 144 is provided and may comprise a DVD/CD drive, hard drive, or other removable media drive, etc. Media drive 144 may be internal or external to multimedia console 100. Application data may be accessed via media drive 144 for execution, playback, etc. by multimedia console 100. Media drive 144 may be connected to I/O controller 120 via a bus, such as a Serial ATA bus or other high speed connection (e.g., IEEE 1394 or the like).

System management controller 122 provides a variety of service functions related to assuring availability of multimedia console 100. Audio processing unit 123 and audio codec 132 form a corresponding audio processing pipeline with high fidelity and stereo processing. Audio data is carried between audio processing unit 123 and audio codec 132 via a communication link. The audio processing pipeline outputs data to A/V port 140 for reproduction by an external audio player or device having audio capabilities.

Front panel I/O subassembly 130 supports the functionality of power button 150 and eject button 152, as well as any LEDs (light emitting diodes) or other indicators exposed on the outer surface of multimedia console 100. System power supply module 136 provides power to the components of multimedia console 100. Fan 138 cools the circuitry within multimedia console 100.

CPU 101, GPU 108, memory controller 110 and various other components within multimedia console 100 may be interconnected via one or more buses, including serial and parallel buses, a memory bus, a peripheral bus, and a processor or local bus using any of a variety of bus architectures. By way of example, and not limitation, such architectures can include a Peripheral Component Interconnects (PCI) bus, PCI-Express bus, etc.

When multimedia console 100 is powered ON, application data may be loaded from system memory 143 into memory 112 and/or caches 102 and 104 and executed on CPU 101. The application may present a graphical user interface that provides a consistent user experience when navigating to different media types available on multimedia console 100. In operation, applications and/or other media contained within media drive 144 may be launched or played from media drive 144 to provide additional functionalities to multimedia console 100.

Figure 2:
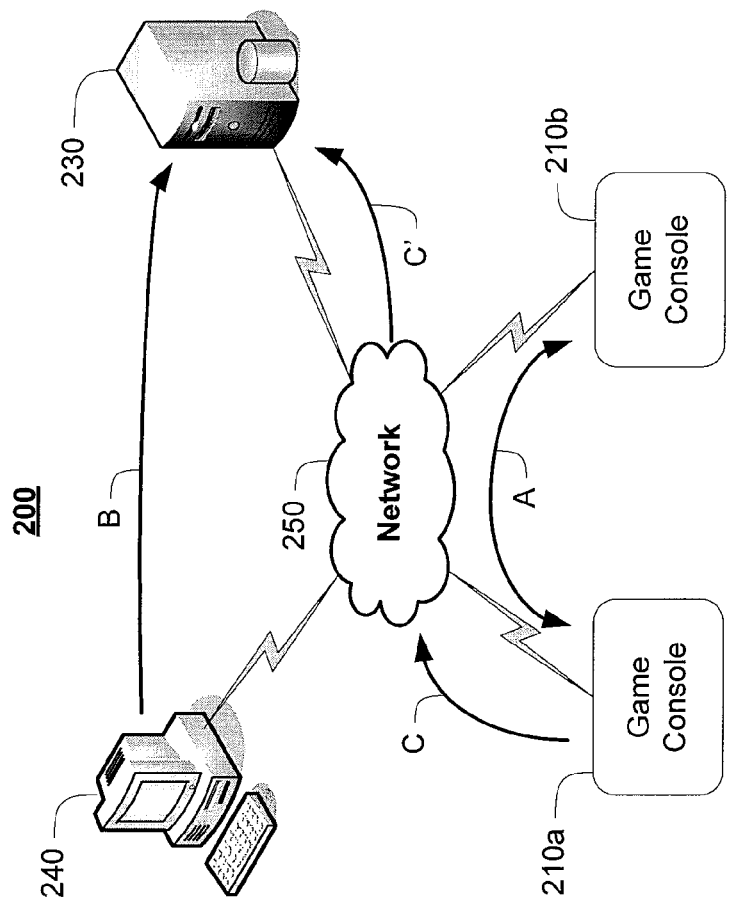
FIG. 2 is a diagram of an example computer network environment in which aspects of an embodiment may be implemented.

Multimedia console 100 may be operated as a standalone system by connecting the system to a television or other display. In this standalone mode, multimedia console 100 may allow one or more users to interact with the system, watch movies, or listen to music. However, with the integration of broadband connectivity made available through network interface 124 or wireless adapter 148, multimedia console 100 may further be operated as a participant in the larger network community as illustrated in FIG. 2.

According to an embodiment, when a game is executed on console 100, it provides information to an online gaming service operating in computer network environment 200. Online gaming service may be any type of hardware and/or software that can be used to perform the tasks disclosed herein. For example, in one embodiment, online gaming service 150 may be provided by one or more software applications running on one or more computing devices, such as a server 230. Online gaming service may track the information for all of the users connected to online gaming service to provide a rich user experience. Online gaming service may track user information across games, consoles, computing devices, etc. By tracking the information for all users of online gaming service, online gaming service can aggregate statistics for all users and measure game playing ability, provide a richer user experience by providing information about friends (e.g., what game they are playing and what skill level they have attained), track user achievements and generally measure statistics for a game aggregated over a large user community.

To provide a consistent data set across games, an embodiment contemplates a schema driven process where each game generates a schema that defines the game data for a particular game. Through a game configuration process, games use a service-defined schema to describe the data the game generates about each game player. By using the configuration process, online gaming service can understand the data as it flows from the game, and it will be able to integrate the data in meaningful ways with the other data that online gaming service understands to create an online profile of each user of the online gaming service. The profile will follow the user wherever he or she goes on online gaming service, i.e., it is game and location independent. Some of the profile, in fact, may be viewable by every user of online gaming service. It will be appreciated that in one embodiment the profile may be created by a user during, for example, a sign in or registration process with online gaming service, as will be discussed below in connection with FIGS. 4-5. A user may perform such a sign in or registration by way of, for example, game console/PC 100, web site or other device such as a PDA, cellular telephone or the like.

Custom Message Actions

FIG. 2 is a diagram of an example computer network environment 200 in which aspects of an embodiment may be implemented. Game consoles 210*a-b* may be, for example, multimedia/game console 100 as was discussed above in connection with FIG. 1. Network 250 may be a Local Area Network (LAN), Wide Area Network (WAN), an intranet, the Internet or a special-use network that is dedicated to enabling operative communication between game consoles 210*a-b* and Live Server Platform (LSP) 230. In one embodiment, LSP 230 is a server that may provide services in connection with a multiplayer gaming and content delivery system such as, for example, XBOX LIVE™, which is provided by Microsoft Corporation of Redmond, Wash. Personal computer (PC) 240 may be any general or special use computer that a user of game console 210*a* or 210*b* may use to access LSP 230, or other devices that are operatively connected to network 250.

In one embodiment, game consoles 210*a-b* may send messages to each other by way of network 250, as represented by arrow A. Although arrow A does not depict such a path in FIG. 2, such messaging may be facilitated by, for example, LSP 230. In addition, a user may use PC 240 to interface with LSP 230 to, for example, change game settings, a personal profile, group memberships, etc., as represented by arrow B. Game console 210*a* (or game console 210*b*) may also communicate with LSP 230 by way of network 250, as represented by arrows C and C'. It will be appreciated that in some conventional systems, the only system-level messages that may be exchanged between game consoles 210*a-b* are user-to-user text messages.

Figure 3:
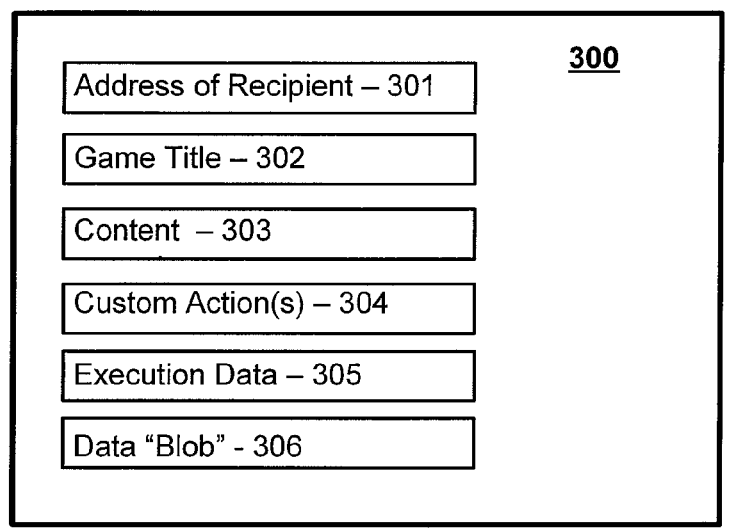
FIG. 3 is a diagram illustrating an example data structure according to one embodiment.

Thus, and was noted above, an embodiment provides an API that permits a game application to generate custom messages that can then be sent by way of a game console's closed loop messaging system. In other words, such an API may enable custom messages to be passed through a game console's closed loop system as if the custom messages were a conventional user-to-user text message or the like. As a result, certain fields within such a custom message may be specified for game-specific functions. To further illustrate one embodiment, FIG. 3 is a diagram illustrating an example data structure. Message 300 may be any type of data structure that is suitable for use within a game console's closed loop messaging system. Message 300 may be a modified form of a message that is typically used in the closed loop messaging system, or may be a different type of message that is rendered compatible with the messaging system by the API discussed above.

Address 301 of the recipient may be a user or game console identifier or the like that contains sufficient information to direct message 300 to its intended recipient. In one embodiment, address 301 may be a user's "gamertag," which is a unique identifier assigned to each user within a multiplayer gaming environment. Game title 302 may be the game to which message 300 is related. It should be appreciated that while the discussion herein focuses on games, the use of the word "game" is meant as an example, as other types of software applications may be run on a game console and any such applications may use message 300 according to an embodiment. Content 303 may be any combination of text, graphics, video, audio or other information that is to be presented to a user on a user interface that is generated by a recipient's game console.

Custom action(s) 304 specify the actions that are to take place upon a user action. For example, a custom action may be to add the recipient to a guild. In such an example, the custom action may contain data necessary for the game console to contact the appropriate LSP or the like and modify the guild's membership (and/or modify the user's profile) to effectuate the change. It will be appreciated that any type of game-related custom action may be included in message 300 and, upon final processing of message 300, game play within the corresponding game application may be affected. Each custom action 304 may, in an embodiment, be formatted to be displayed to a user as a button or other selectable object in a UI generated by the user's game console. Thus, upon selection of the appropriate UI object, a user may be able to accept or decline the invitation (or whatever other type of action is appropriate to the content of message 300). As will be discussed below, the selection by a user of a particular custom action 304 may generate information that can be passed to an appropriate LSP or game application indicating the user's selection.

Execution data 305 identifies the manner in which the receiving game console is to carry out one or more of the custom actions 304. In one embodiment, execution data 305 is part of each custom action 304, and in another embodiment execution data 305 may be a separate part of message 300. Execution data 305 may include, for example, a URL of an appropriate LSP that can carry out functions related to message 300. Alternatively, execution data 305 may specify a game application that should receive message 300 for processing once the user has viewed and responded to message 300 in a game console—generated UI.

As noted above, data "blob" 306 may be any type of data payload that is intended to be received by the recipient game console, but is opaque (i.e., unprocessed by) the game console. Instead, blob 306 is passed through the game console and on to message 300's final destination (which, in an embodiment, may be an LSP or a game application). For example, data blob 306 may be information that is usable by a game application to effectuate a custom action 304 in accordance with a user selection. As will be discussed below, in an embodiment a game console may receive a user input with respect to one or more custom actions 304. The game console may then forward an indication (e.g., in the form of a data object, data value or the like) to the game application to inform the game application of the user input. For example, if custom action 304 corresponds to a guild invitation, the user input may be to accept or decline. In such a case, blob 306 may contain data to either add the user to the guild (if the user accepts) or to return a notification to the inviting party that the invitation was declined (if the user declines). In an embodiment, and as noted above, blob 306 is not accessed by the game console, or by the game console messaging system. Instead, blob 306 may be simply passed through the game console and/or messaging system without any meaningful processing. It will be appreciated that by passing blob 306 through the game console and/or messaging system without processing, an embodiment can "piggyback" this additional data (and the functionality provided by such data) on a conventional, text-only, user-to-user game messaging system.

Figure 4:
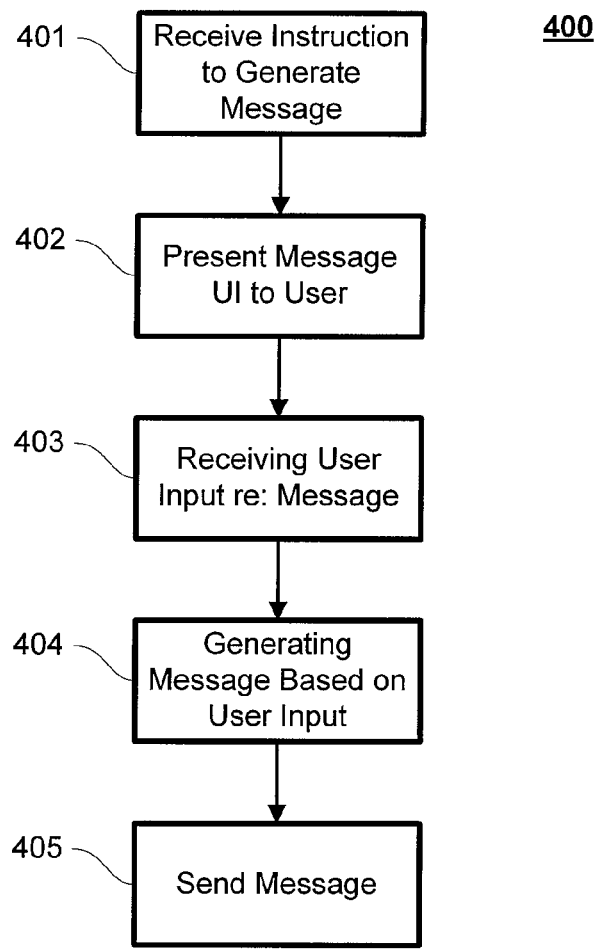
FIG. 4 is a flowchart illustrating an example method of generating a message according to one embodiment.

FIG. 4 is a flowchart illustrating an example method 400 of generating a message. It will be appreciated that in one embodiment an API or the like enables a developer to write game application code that uses a game console's messaging system to convey additional information. As noted above, conventional game messaging systems are typically closed-loop systems, whereby only standard console-to-console (and therefore user-to-user) text messages are provided. Such an API permits a developer to pass additional information (e.g., custom actions 304, blob 306, etc.) through the closed-loop system. Such an API may be configured in any manner while remaining consistent with an embodiment, and therefore details relating to the exact configuration of such an API (or other programming construct) are omitted herein for clarity.

At 401, an instruction to generate a message is received by a game console. Such an instruction may be received from a game application that is currently running on the console. In one embodiment, the instruction may include the contents of message 300 as discussed above in connection with FIG. 3. In an alternative embodiment, the instruction may include information needed by the game console to generate the message. Method 400 may be initiated by the game, or by the user of the game. For example, the game may automatically generate a message when certain conditions are present with respect to the game. Alternatively, the user may initiate method 400 manually, such as by selecting an option or the like. Pre-defined messages may be stored within a memory of the game console or within a computer readable medium on which the game application is stored, for example. Thus, upon the instruction of 401, an appropriate message may be selected. Alternatively, a messages may be dynamically generated from a library of message components, or the like.

At 402, a message is presented to a user via a user interface (UI). In one embodiment, the UI is generated by the game console as part of a pre-existing messaging interface. Alternatively, the UI may be generated within the game application. The user may have the option of modifying the message, specifying a recipient, etc. For example, if the instruction of 401 was to generate a message that invites a recipient of the message to a guild, then at 402 a user may identify the recipient (e.g., using a Gamerid, email address, etc.), specify the guild and the like. Alternatively, the message may be sent automatically, without user intervention.

At 403, a user input related to the message is received. The user input may relate to the user's selections of certain options presented at 402. At 404, a message is generated based on the user input. Step 404 may involve further communication with the game application, or the game console may simply perform 404 on its own without further intervention by the game. At 405, the message is sent. As noted above, the message may be sent by way of the game console's closed loop messaging system, a computer network such as the Internet, an LSP or the like.

Figure 5:
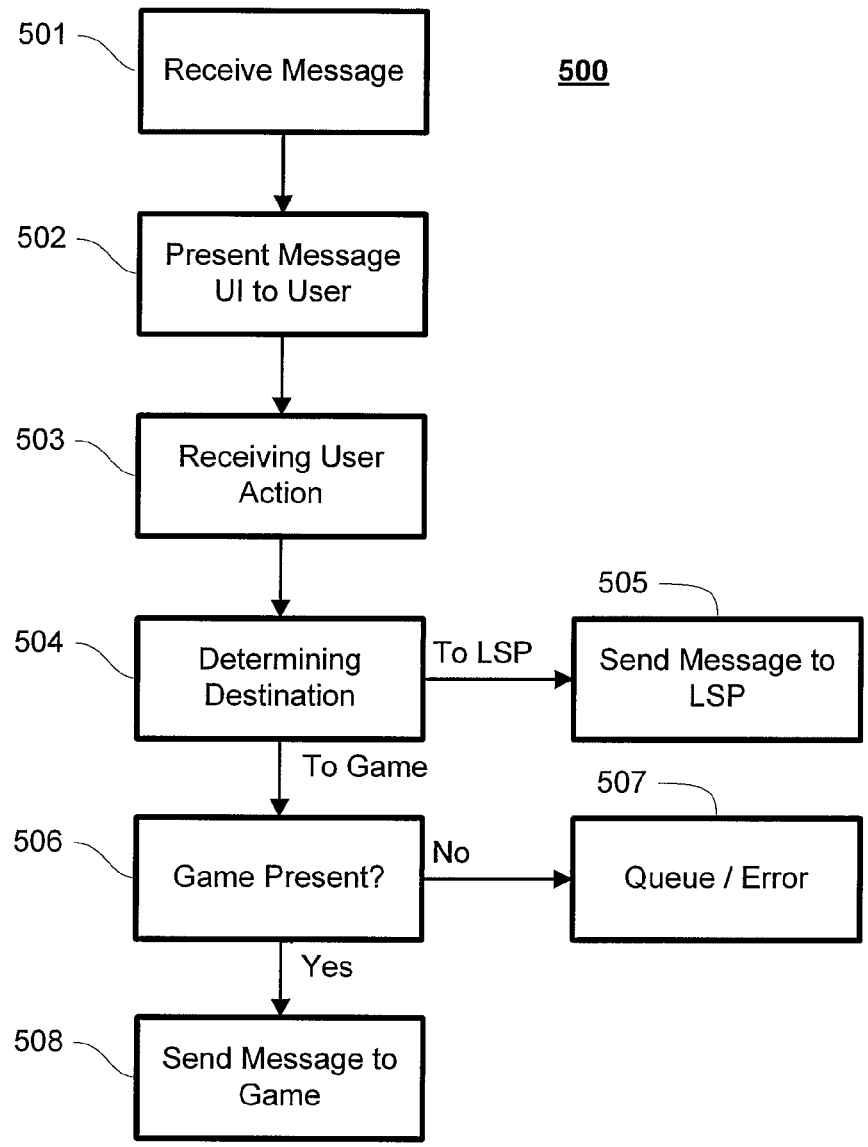
FIG. 5 is a flowchart illustrating an example method of processing a message according to one embodiment.

FIG. 5 is a flowchart illustrating an example method 500 of processing a message according to one embodiment. It will be appreciated that in one embodiment an API or the like enables a developer to write game application code that uses a game console's messaging system to process a message containing information that is not typically present in a conventional message. As noted above, conventional game messaging systems are typically closed-loop systems, whereby only standard console-to-console (and therefore user-to-user) text messages are provided. Such an API permits a developer to process additional information (e.g., custom actions 304 and blob 306 as discussed above in connection with FIG. 3, etc.) through the closed-loop system. Such an API may be configured in any manner while remaining consistent with an embodiment, and therefore details relating to the exact configuration of such an API (or other programming construct) are omitted herein for clarity.

At 501, a message (such as the message generated by method 400 of FIG. 4, above) is received at a receiving game console by way of a closed loop messaging system or the like. At 502, the game console presents the message to a user by way of a UI. The UI may be a standard system-provided messaging interface that may be used for other, conventional messages (such as the user-to-user text messages discussed above). Unlike the interface presented in connection with conventional messages, however, the UI generated in connection with 502 may include customized objects such as, for example, text, images, buttons and the like. The content of any of these objects may be specified during the creation of the message (such as during method 400 discussed above in connection with FIG. 4) or may be predetermined and selectable during method 400, for example.

At 503, a user action with respect to the message is received by way of the UI. For example, the user may accept or decline an invitation by selecting an on-screen button, pull-down menu or the like. As was noted above in connection with FIG. 3, the message may include execution data 305 that specifies how the options contained in the message should be carried out. Each object to be displayed (such as, for example, each custom action 304 as discussed above in connection with FIG. 3) may have unique execution data 305 associated with it. In such an embodiment, for example, each custom action could be carried out in a different manner. In addition, each custom action could be carried out in a different manner depending on the received user input (e.g., an invitation acceptance could be carried out differently than if the invitation is declined). Alternatively, all or part of the message may have execution data 305 associated with it, whereby certain options may be carried out in the same manner, regardless of the user selection.

Thus, at 504, a destination of the message may be determined from such execution data. In one embodiment, two destinations are available: a game that is running on the game console, or an LSP that is associated with the game console and/or the game identified in the message. It will be appreciated, however, that any number and type of destinations may be possible, and the present description's use of these two destinations should not be read as being all-inclusive. In an alternative embodiment, no execution data may be present, in which case a default destination may be assumed by the receiving game console.

Thus, if the determination of 504 is that the destination of the message is an LSP, at 505 the message is sent to the LSP for processing. "Sending" the message to the LSP may include passing the custom action, any data payload (i.e., the data "blob") and an indication of the user input received with respect to a custom action (e.g., accept, decline, etc.). Such an indication may be sent in the form of a data value, a variable setting, or the like.

"Processing" the message may include any activity that is specified in the message. For example, if the message was an invitation to a guild, and the recipient accepted the invitation, the LSP may look up the guild membership and add the recipient. It will be appreciated that a data payload may contain the information needed by the LSP to process the message. In an embodiment, and as was noted above, the data payload may simply be passed through the receiving game console and sent to the LSP upon presenting the UI and receiving the user input.

If, however, the determination of 504 is that the destination of the message is a game application, at 506 a determination is made as to whether the game is present (i.e., currently running) on the game console. If not, at 507, the message is either queued (e.g., in game console memory or the like) until the game is running and can process the message, or an error message may be generated. Such an error message may also include a notice to a user that the game application should be running on the game console for the message to be processed. If the determination of 506 is that the game is present on the game console, the message is sent to the game for processing at 508. Such sending and processing may be as was discussed above in connection with 505. In addition, the game application may, in turn, communicate with an LSP or the like to process the message.

While the various embodiments have been described in connection with the preferred embodiments of the various figures, it is to be understood that other similar embodiments may be used or modifications and additions may be made to the described embodiment for performing the same function of the various embodiments without deviating therefrom. Therefore, the embodiments should not be limited to any single embodiment, but rather should be construed in breadth and scope in accordance with the appended claims.

What is claimed:

1. A method comprising:
running, on a sending game console, a multiplayer game application that is configured to communicate with an online gaming service that provides a multiplayer gaming environment, wherein:
the sending game console is configured to exchange console-to-console text messages with a receiving game console via a game console messaging service that operates independently from the multiplayer game application running on the sending game console and a corresponding multiplayer game running on the receiving game console, and
the console-to-console text messages are addressed to recipients using gamer identifiers assigned to users of the multiplayer gaming environment;
exposing, on the sending game console, an Application Program Interface (API) to the multiplayer game application running on the sending game console, wherein:
the API enables the multiplayer game application to generate game-related custom messages that are compatible with the game console messaging service,
the API provides a data structure for a game-related custom message that is automatically generated by the multiplayer game application based on game conditions, the game-related custom message containing a data payload that is to be passed through the receiving game console and processed by the corresponding multiplayer game application running on the receiving game console, and
the data payload includes instructions that, when processed by the corresponding multiplayer game running on the receiving game console, effectuate a game-specific function which affects game play within the corresponding multiplayer game application running on the receiving game console;
presenting the game-related custom message to a user of the sending game console via a messaging user interface generated by the sending game console; and
sending the game-related custom message from the sending game console to the receiving game console as a console-to-console message via the game console messaging service in response to input from the user of the sending game console, the game-related custom message including:
a gamer identifier that identifies a user of the receiving game console,
a selectable object that is to be displayed in a messaging user interface generated by the receiving game console and that allows the user of the receiving game console to accept the game-specific function,
the data payload including the instructions that effectuate the game-specific function, and
execution data that forwards the data payload from the messaging user interface generated by the receiving console to the corresponding multiplayer game application running on the receiving game console in response to the user of the receiving game console selecting the selectable object to accept the game-specific function.

2. The method of claim 1, wherein:
the messaging user interface generated by the sending game console displays one or more options for modifying the game-related custom message.

3. The method of claim 1, wherein:
the data payload is opaque to the game console messaging service, and
the execution data is configured to forward the game-related custom message including the data payload to the corresponding multiplayer game application running on the receiving game console.

4. The method of claim 1, wherein the game console messaging service is a closed-loop communication system.

5. The method of claim 1, wherein:
the online gaming service enables users to join game-related groups associated with the multiplayer game application, and
the instructions included in the data payload are configured to modify membership of a game-related group that includes the user of the sending game console by adding the user of the receiving game console to the game-related group.

6. The method of claim 1, wherein the instructions included in the data payload are configured to change game settings of the corresponding multiplayer game running on the receiving game console.

7. The method of claim 1, wherein:
the API provides the data structure for the game-related custom message by modifying a console-to-console text message to include a data field for the data payload and one or more data fields for the selectable object and the execution data.

8. A game console comprising:
a processor configured to execute code; and
memory storing executable code configured for:
running a multiplayer game application that is configured to communicate with an online gaming service that provides a multiplayer gaming environment, wherein:
the game console is configured to exchange console-to-console text messages with a receiving game console via a game console messaging service that operates independently from the multiplayer game application running on the game console and a corresponding multiplayer game running on the receiving game console, and
the console-to-console text messages are addressed to recipients using gamer identifiers assigned to users of the multiplayer gaming environment;
exposing an Application Program Interface (API) to the multiplayer game application running on the game console, wherein:
the API enables the multiplayer game application to generate game-related custom messages that are compatible with the game console messaging service,
the API provides a data structure for a game-related custom message that is automatically generated by the multiplayer game application based on game conditions, the game-related custom message containing a data payload that is to be passed through the receiving game console and processed by the corresponding multiplayer game application running on the receiving game console, and
the data payload includes instructions that, when processed by the corresponding multiplayer game running on the receiving game console, effectuate a game-specific function which affects game play within the corresponding multiplayer game application running on the receiving game console;
presenting the game-related custom message to a user of the game console via a messaging user interface generated by the game console; and
sending the game-related custom message from the game console to the receiving game console as a console-to-console message via the game console messaging service in response to input from the user of the game console, the game-related custom message including:
a gamer identifier that identifies a user of the receiving game console,
a selectable object that is to be displayed in a messaging user interface generated by the receiving game console and that allows the user of the receiving game console to accept the game-specific function, the data payload including the instructions that effectuate the game-specific function, and
execution data that forwards the data payload from the messaging user interface generated by the receiving game console to the corresponding multiplayer game application running on the receiving game console in response to the user of the receiving game console selecting the selectable object to accept the game-specific function.

9. The game console of claim 8, wherein:
the online gaming service enables users to join game-related groups associated with the multiplayer game application, and
the instructions included in the data payload are configured to modify membership of a game-related group that includes the user of the sending game console by adding the user of the receiving game console to the game-related group.

10. The game console of claim 8, wherein:
the game console messaging service is a closed-loop communication.

11. The game console of claim 8, wherein:
the messaging user interface generated by the game console displays one or more options for modifying the game-related custom message.

12. The game console of claim 8, wherein:
the data payload is opaque to the game console messaging service, and
the execution data is configured to forward the game-related custom message including the data payload to the corresponding multiplayer game application running on the receiving game console.

13. The game console of claim 8, wherein:
the API provides the data structure for the game-related custom message by modifying a console-to-console text message to include a data field for the data payload and one or more data fields for the selectable object and the execution data.

14. The game console of claim 8, wherein:
the memory further stores a set of predefined game-related custom messages provided by the multiplayer game application, and
each predefined game-related custom message pertains to a different game-specific function which affects game play within the corresponding multiplayer game application running on the receiving game console.

15. A computer-readable hardware device having memory storing executable code that, when executed by a processor of a game console, causes the game console to perform a method comprising:
running a multiplayer game application that is configured to communicate with an online gaming service that provides a multiplayer gaming environment, wherein:
the game console is configured to exchange console-to-console text messages with a receiving game console via a game console messaging service that operates independently from the multiplayer game application running on the game console and a corresponding multiplayer game running on the receiving game console, and
the console-to-console text messages are addressed to recipients using gamer identifiers assigned to users of the multiplayer gaming environment;
exposing an Application Program Interface (API) to the multiplayer game application running on the game console, wherein:
the API enables the multiplayer game application to generate game-related custom messages that are compatible with the game console messaging service,
the API provides a data structure for a game-related custom message that is automatically generated by the multiplayer game application based on game conditions, the game-related custom message containing a data payload that is to be passed through the receiving game console and processed by the corresponding multiplayer game application running on the receiving game console, and the data payload includes instructions that, when processed by the corresponding multiplayer game running on the receiving game console, effectuate a game-specific function which affects game play within the corresponding multiplayer game application running on the receiving game console;

presenting the game-related custom message to a user of the game console via a messaging user interface generated by the game console; and sending the game-related custom message from the game console to the receiving game console as a console-to-console message via the game console messaging service in response to input from the user of the game console, the game-related custom message including:

a gamer identifier that identifies a user of the receiving game console, a selectable object that is to be displayed in a messaging user interface generated by the receiving game console and that allows the user of the receiving game console to accept the game-specific function, the data payload including the instructions that effectuate the game-specific function, and execution data that forwards the data payload from the messaging user interface generated by the receiving game console to the corresponding multiplayer game application running on the receiving game console in response to the user of the receiving game console selecting the selectable object to accept the game-specific function.

16. The computer-readable hardware device of claim 15, wherein:
the messaging user interface generated by the game console displays one or more options for modifying the game-related custom message.

17. The computer-readable hardware device of claim 15, wherein the API enables the multiplayer game application to generate a game related custom message comprising:
a data payload that is opaque to the game console messaging service, and execution data that is configured to forward the game-related custom message including the data payload to the corresponding multiplayer game application running on the receiving game console.

18. The computer-readable hardware device of claim 15, wherein the API enables the multiplayer game application to generate came-related custom messages that are compatible with a closed-loop game console messaging service.

19. The computer-readable hardware device of claim 15, wherein:
the online gaming service enables users to join game-related groups associated with the multiplayer game application, and
the API enables the multiplayer game application to generate a game-related custom message that modifies membership of a game-related group that includes the user of the sending game console by adding the user of the receiving game console to the game-related group.

20. The computer-readable hardware device of claim 15, wherein:
the API provides the data structure for the game-related custom message by modifying a console-to-console text message to include a data field for the data payload and one or more data fields for the selectable object and the execution data.

* * * * *